US 6,606,619 B2

(12) United States Patent
Ortega et al.

(10) Patent No.: US 6,606,619 B2
(45) Date of Patent: *Aug. 12, 2003

(54) COMPUTER PROCESSES FOR SELECTING NODES TO CALL TO ATTENTION OF A USER DURING BROWSING OF A HIERARCHICAL BROWSE STRUCTURE

(75) Inventors: Ruben E. Ortega, Seattle, WA (US); Joel R. Spiegel, Woodinville, WA (US); Lauri E. Bortscheller, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/208,337

(22) Filed: Jul. 29, 2002

(65) Prior Publication Data

US 2003/0050916 A1 Mar. 13, 2003

Related U.S. Application Data

(63) Continuation of application No. 06/489,968, filed on Nov. 18, 1999.

(51) Int. Cl.⁷ .............................. G06F 17/30; G06F 7/00
(52) U.S. Cl. ...................... 707/2; 707/1; 707/3; 707/5
(58) Field of Search ...................... 707/1–10, 100–104.1

(56) References Cited

U.S. PATENT DOCUMENTS

| | | | |
|---|---|---|---|
| 5,625,783 A | | 4/1997 | Ezekiel et al. |
| 5,630,125 A | | 5/1997 | Zellweger |
| 5,781,904 A | | 7/1998 | Oren et al. |
| 5,842,218 A | * | 11/1998 | Robinson ............ 707/102 |
| 5,864,854 A | | 1/1999 | Boyle |
| 5,895,470 A | | 4/1999 | Pirolli et al. |
| 5,991,756 A | | 11/1999 | Wu |
| 6,014,639 A | | 1/2000 | Fohn et al. |
| 6,029,195 A | | 2/2000 | Herz |
| 6,055,515 A | | 4/2000 | Consentino et al. |
| 6,064,980 A | * | 5/2000 | Jacobi et al. .......... 705/26 |
| 6,144,962 A | * | 11/2000 | Weinberg et al. ...... 707/10 |
| 6,216,134 B1 | * | 4/2001 | Heckerman et al. .... 707/104.1 |
| 6,317,722 B1 | | 11/2001 | Jacobi et al. |
| 6,317,734 B1 | | 11/2001 | Zellweger |
| 6,360,227 B1 | * | 3/2002 | Aggarwal et al. ...... 707/102 |
| 6,366,910 B1 | | 4/2002 | Rajaraman et al. |
| 6,385,619 B1 | * | 5/2002 | Eichstaedt et al. ..... 707/104.1 |
| 6,421,675 B1 | | 7/2002 | Ryan et al. |
| 6,460,033 B1 | | 10/2002 | Perttunen |
| 6,460,036 B1 | * | 10/2002 | Herz ................... 707/10 |

FOREIGN PATENT DOCUMENTS

| | | |
|---|---|---|
| EP | 0 827 063 A1 | 3/1998 |
| WO | WO 99/41694 | 8/1999 |
| WO | WO 99/45487 | 9/1999 |

OTHER PUBLICATIONS

Allowed Claims of Applicants' co–pending U.S. Appl. No. 09/443,013, filed Nov. 18, 1999.

* cited by examiner

Primary Examiner—Greta Robinson
Assistant Examiner—Linh Black
(74) Attorney, Agent, or Firm—Knobbe, Martens, Olson & Bear LLP

(57) ABSTRACT

A computer-implemented process identifies specific nodes within a browse tree or other hierarchical browse structure based on historical actions of online users, and calls such nodes to the attention of users during navigation of the browse structure. The system and method are particularly useful for assisting users in locating popular products and/or product categories within a catalog of an online merchant, but may be used in connection with browse structures used to locate other types of items. In one embodiment, node popularity levels are determined periodically (e.g., once per day) based on user activity data that represents users' affinities for such nodes (items and/or item categories). Popular nodes are called to the attention of users, preferably by automatically "elevating" such nodes for display within the browse tree. The node elevation process may also be used to elevate nodes that are predicted to be of interest to a particular user.

50 Claims, 12 Drawing Sheets

FIG. 6

SCORE SETS 610

USER #: 128928756
USER #: 128928755
USER #: 128928754
USER #: 128928753

| BOOK CATEGORY | PURCHASE | CLICK-THROUGH | SEARCH | RATING | SHOPPING CART | WEIGHTED SCORES |
|---|---|---|---|---|---|---|
| AIR SPORTS & RECREATION | 0 | 0 | 0 | 0 | 0 | 0 |
| AUDIOBOOKS | 3 | 24 | 35 | 3 | 7 | 14632 |
| AUTOMOTIVE | 0 | 19 | 21 | 0 | 0 | 8082 |
| ... | ... | ... | ... | ... | ... | ... |
| REFERENCE | 0 | 0 | 0 | 0 | 0 | 0 |
| SCUBA | 0 | 0 | 0 | 0 | 0 | 0 |
| SWIMMING | 8 | 73 | 57 | 12 | 6 | 31662 |
| YOGA | 0 | 0 | 0 | 0 | 0 | 0 |

SCORE SET 810

| BOOK CATEGORY | PURCHASE | CLICK-THROUGH | SEARCH | RATING | SHOPPING CART | WEIGHTED SCORES |
|---|---|---|---|---|---|---|
| AIR SPORTS & RECREATION | 564 | 616 | 1055 | 61 | 57 | 16009 |
| AUDIOBOOKS | 2016 | 8465 | 2461 | 248 | 189 | 39315 |
| AUTOMOTIVE | 5354 | 7715 | 3403 | 1127 | 2092 | 95124 |
| ... | ... | ... | ... | ... | ... | ... |
| REFERENCE | 715 | 946 | 1035 | 183 | 247 | 14394 |
| SCUBA | 226 | 546 | 887 | 311 | 302 | 10069 |
| SWIMMING | 3452 | 4652 | 4512 | 415 | 521 | 59675 |
| YOGA | 1530 | 765 | 996 | 534 | 454 | 26503 |

FIG. 8

SCORE CALCULATIONS
_1010_

| BOOK CATEGORY | INDIVIDUAL USER | COLLECTIVE USERS | TOTAL SCORES |
|---|---|---|---|
| AIR SPORTS & RECREATION | 0 | 16009 | 16009 |
| AUDIOBOOKS | 14632 | 39315 | 53947 |
| AUTOMOTIVE | 8082 | 95124 | 103206 |
| ⋮ | ⋮ | ⋮ | ⋮ |
| REFERENCE | 0 | 14394 | 14394 |
| SCUBA | 0 | 10069 | 10069 |
| SWIMMING | 31662 | 59675 | 26503 |
| YOGA | 0 | 26503 | 91337 |

FIG. 10

COMPUTER PROCESSES FOR SELECTING NODES TO CALL TO ATTENTION OF A USER DURING BROWSING OF A HIERARCHICAL BROWSE STRUCTURE

RELATED APPLICATIONS

This application is a continuation of U.S. No. 06/489,968, filed Nov. 18, 1999, the disclosure of which is hereby incorporated by reference.

FIELD OF THE INVENTION

The present invention relates to browse trees and other types of hierarchical browse structures used to help users locate online content. More specifically, the invention relates to methods for automatically identifying and calling to the attention of users the nodes (categories and/or items) of a browse tree that are the most popular, or are otherwise predicted to be interesting to users.

BACKGROUND OF THE INVENTION

With the increasing popularity of the Internet and the World Wide Web, it has become common for merchants to set up Web sites for marketing and selling products and services. One example of such a Web site is the online site of AMAZON.COM, the assignee of the present invention. Via this site, consumers can access and place orders from an online catalog that includes millions of book titles, compact discs, gifts, items for auction, etc.

Many online merchants and other businesses group their products, services or other items into a set of categories and subcategories of a browse tree. For example, the Yahoo Web site (www.yahoo.com) includes a browse tree which acts as a general Web directory, the Ebay Web site (ebay.com) includes a browse tree for locating auction-related content (auction events, etc.), and the Amazon.com Web site includes a subject-based browse tree for locating book titles.

SUMMARY OF THE INVENTION

One problem commonly encountered by online merchants is the inability to effectively present their goods and services to consumers via their browse trees. Due to the large number of items and item categories, many "popular" categories and items (those that have experienced significant user activity) remain hidden from the user. For example, when a user begins navigation of a typical browse tree for locating books, the user initially sees a list of categories that broadly describe different book subjects. At this point, the user normally would not see more specific categories such as "Olympics," even though "Olympics" may be the most popular category at that time. The "Olympics" category may be nested within the browse tree under Books/Sports & Outdoors/Events/Olympics, requiring the user to navigate downward through multiple levels of the tree to find the category. Similarly, the user would not see the most popular books (e.g., the current bestsellers) because they too would be nested within the browse tree (typically at the lowest level). Further, once the user locates the popular categories and book titles, the user typically has no reason to believe that they are currently the most popular. The ability for users to identify the most popular items and categories helps the users locate items that have gained acceptance within a community or within the population at large.

The present invention addresses these and other problems by providing a computer-implemented system and method for automatically identifying the most "popular" nodes (categories and/or items) within a browse tree or other hierarchical browse structure, and for calling such nodes to the attention of users during navigation of the browse structure. The system and method are particularly useful for assisting users in locating popular products (e.g., books) and/or product categories within a catalog of an online merchant, but may be used in connection with browse structures used to locate other types of items, such as online auctions, chat rooms, and Web sites.

The node popularity levels are preferably determined periodically based on user activity data that reflects users' affinities for particular nodes. The criteria used to measure such popularity levels depend upon the nature and purpose of the browse tree. For example, in the context of a tree used to locate items sold by a merchant, the popularity of each item may be based on one or more of the following, among other, criterion: the number of times the item was purchased, the number of times the item was viewed (within and/or outside the browse tree), the number of times the item was rated or reviewed, and the average rating of the item. The popularity of each category of the same tree may be based on one or more of the following, among other, criterion: the average popularity of the items contained within the category, the number of purchases made within the category relative to the number of items in the category, the number times the category was selected ("clicked through") or searched, and the number of times the category was selected as a destination node of the tree. The specific criteria used within a given system are largely a matter of design choice, and may be varied in order to achieve a particular objective.

The popular nodes are preferably called to the attention of users by automatically "elevating" the nodes along child-parent paths for display within the browse structure. For example, when the user selects a particular non-leaf category (a category that contains subcategories) for viewing, the most popular items corresponding to the selected category may be displayed together with (e.g., on the same Web page as) the immediate subcategories, allowing the user to view or directly access these items without navigating to lower levels of the browse tree. Subcategories may be elevated for display in a similar manner.

In a preferred embodiment, the various popularity criteria are incorporated into a scoring algorithm which is used to generate a popularity score for each node that is a candidate for elevation. These scores are then used to elevate the nodes within the tree. The nodes are preferably selected for elevation recursively, on a node-by-node basis, by selecting the most popular nodes (e.g., the 3 nodes with highest scores) from the level below. The most popular nodes are therefore propagated to the highest levels of the tree.

Preferably, the node popularity levels are determined periodically (e.g., once per hour) based on user activity data collected over a predetermined period or window of time (e.g., the last week or month). As a result, the nodes that are elevated for display change over time to reflect the current interests of users. In one embodiment, nodes are selected for elevation based solely on collective activity data, without regard to user identity. In another embodiment, information known about the individual user is incorporated into the selection process to select nodes that reflect the predicted or known interests of the particular user.

The system may also use community affiliations as a basis for selecting nodes to be elevated. For example, the nodes may be scored and elevated based in-whole or in-part on activity data collected for the particular community or communities of which the user is a member. The communities may include "explicit membership" communities (communities that users explicitly join) and "implicit-membership" communities (communities for which membership is based on information known about the user, such as the user's email domain, Internet service provider, purchase history, or shipping address).

In one embodiment, for example, the popularity score for each node is calculated as the sum of three components: a personal score which is based on the actions of the particular user, a community score which is based on the actions of the members of the user community or communities, and a collective score which is based on the actions of all customers of the system. The time windows that are applied to the activity data for purposes of generating these component scores may differ; for example, it may be desirable to use a longer window for generating the personal scores (to increase the likelihood of capturing relevant personal activity data), and use a shorter window for generating the collective scores.

In an embodiment for use by an online bookseller, the system and method are used to "feature" the most popular book titles and leaf categories on Web pages corresponding to higher-level categories. The most popular books and categories are preferably determined periodically based on purchase counts, category click-through rates, and/or other types of user activity data. The nodes to be featured are preferably selected recursively, on a node-by-node basis, by selecting the most popular nodes from the immediate children of the current node. Books and low-level categories that are currently very popular thus tend to be featured at many different levels of the tree, increasing the probability of exposure in proportion to level of popularity. Preferably, the nodes are selected for elevation based on a combination of user-specific and collective user activity data, so that the featured books and categories reflect both the interests of the particular user and the interests of others.

In an online auctions embodiment in which the nodes represent auction events, the node popularity levels may be based, for example, on the number or frequency of bids. In this embodiment, auctions that experience relatively heavy bidding activity tend to be elevated within the tree. Other criteria, such as the number of bidders, the average bid increment, the difference between the current bid and the asking price, and the average rating of the seller may additionally or alternatively be used.

The invention may also be used to highlight personal recommendations of items that exist within the browse tree. For example, an item may be selected from the tree for personal recommendation using a collaborative filtering, content-based filtering, or other recommendations algorithm, and automatically featured at some or all of the categories in which the item falls. Alternatively, the criteria and methods used to generate personal recommendations may simply be incorporated into the algorithm for generating item popularity scores.

BRIEF DESCRIPTION OF THE FIGURES

These and other features and advantages of the invention will now be described with reference to the drawings of certain preferred embodiments, which are intended to illustrate and not to limit the invention, and in which:

FIG. 6 further illustrates the method shown in FIG. 5.

FIG. 8 further illustrates the method shown in FIG. 7.

FIG. 10 further illustrates the FIG. 9 method.

DETAILED DESCRIPTION OF THE PREFERRED EMBODIMENTS

Figure 1A:
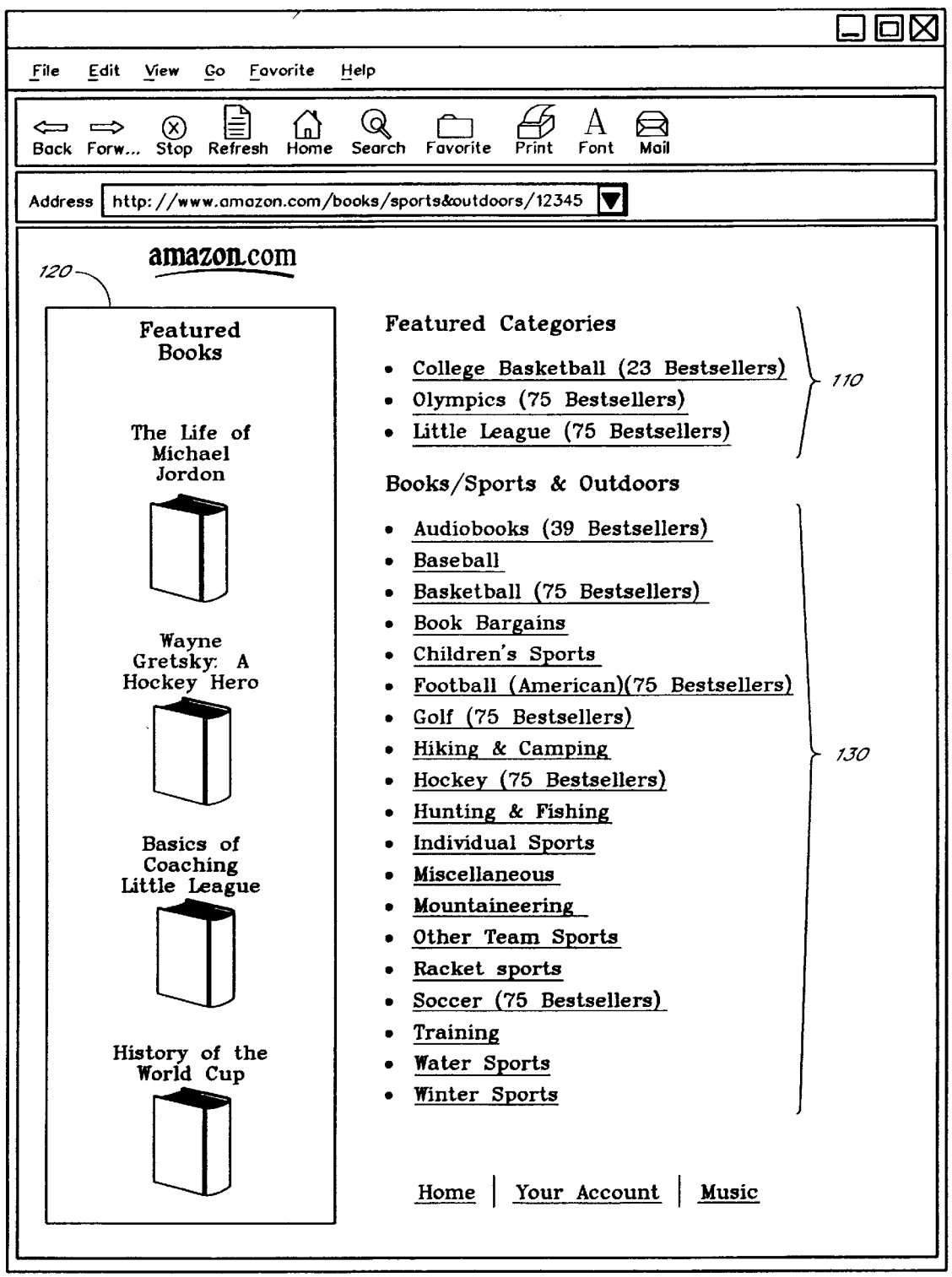
FIG. 1A illustrates an example Web page which includes a set of featured book categories and a set of featured book titles that have been elevated for display.

A system which represents a preferred embodiment and example application of the invention will now be described with reference to the drawings. Variations to this system which represent other preferred embodiments will also be described. In the disclosed system, the invention is used to automatically identify book titles and low-level book categories to be featured at higher levels of a browse tree of an online bookseller. It will be recognized, however, that the invention is also applicable to browse trees used to help users locate other types of categories and items, including but not limited to authors, news articles, online auction items, other types of products, sound clips, downloadable software, chat rooms, classified ads, restaurants, stores, multimedia channels, and other Web sites. Although the invention is used in the disclosed system to feature both categories and items (book titles), it should be understood that, in other embodiments, only one of these two types of nodes, or a different type of node, could be featured.

For purposes of illustration, the preferred embodiment will be described in the context of the browse tree for locating books within a Web site of an online bookseller, such as Amazon.com. The details of the browse tree and of this specific implementation are set forth in order to illustrate, and not to limit, the invention. The scope of the invention is defined only by the appended claims.

I. Overview

The various book titles that are available for purchase through the bookseller's Web site are arranged within various categories and subcategories of a browse tree. Users of the Web site can navigate the browse tree to locate books titles (the "items" of the browse tree) based on various pre-defined subjects and other classifications. Users can also locate books of interest using the site's search engine, recommendation services, and other types of navigational aids. Users can also submit reviews and ratings of books they have read.

The browse tree is preferably in the form of a directed acyclic graph (a tree that allows a child node to have multiple parents), although a pure tree or other type of browse structure could be used. The lowest-level nodes (or "leaf-nodes") of the browse tree represent individual book titles, and all other nodes represent categories (including sub-categories) of books. The lowest-level categories (those with no subcategories) are referred to herein as "leaf categories." Each node is preferably displayed to the user as a hyperlink (see FIG. 1A), although other types of user interfaces could be used. Selection of a node (hyperlink) causes the children of the node to be displayed. The organization of the browse tree may be specified by system administrators using tools and methods that are well known in the art.

The categories may include pre-existing categories that are used within the industry and/or categories that are created for purposes of implementing the invention. The categories may alternatively be selected or modified dynamically (automatically and/or by system administrators) based on user actions and other criteria. Table 1 illustrates an example set of top-level book categories that may be used in one embodiment. As illustrated by Table 1, the book categories are primarily in the form of subject and genre classifications.

TABLE 1

| | |
|---|---|
| 1. Arts & Music | 13. Literature & Fiction |
| 2. Audiobooks | 14. Mystery & Thrillers |
| 3. Biographies & Memoirs | 15. Nonfiction |
| 4. Business & Investing | 16. Parenting & Families |
| 5. Children's Books | 17. Reference |
| 6. Computers & Internet | 18. Religion & Spirituality |
| 7. Cooking, Food & Wine | 19. Romance |
| 8. Entertainment | 20. Science & Nature |
| 9. Health, Mind & Body | 21. Science Fiction & Fantasy |
| 10. History | 22. Sports & Outdoors |
| 11. Home & Garden | 23. Travel |
| 12. Horror | 24. Young Adult |

Further, the categories are preferably selected so as to encompass a reasonably wide range of related user interests. Each category may lead the user to another set of subcategories. For example, when a user selects the "Sports & Outdoors" top-level book category, the user may be led to another set of book categories similar to those shown in Table 2. This second level of categories can also have a set of subcategories, and so forth, creating a tree-like structure. In the preferred embodiment, the categories are not mutually exclusive (i.e., a book can fall within multiple categories, and/or a subcategory can fall within multiple categories), although mutually exclusive categories and items can alternatively be used.

TABLE 2

| | |
|---|---|
| 1. Audiobooks | 11. Individual Sports |
| 2. Baseball | 14. Miscellaneous |
| 3. Basketball | 15. Mountaineering |
| 4. Book Bargains | 16. Other Team Sports |
| 5. Children's Sports | 17. Racket Sports |
| 6. Football (American) | 18. Soccer |
| 7. Golf | 19. Training |
| 8. Hiking & Camping | 20. Water Sports |
| 9. Hockey | 21. Winter Sports |
| 10. Hunting & Fishing | |

Preferably, each category and item has a unique name that can be displayed to the user. For example, while many book subcategories may appear on the Web page as a "General" link, the actual link refers to the complete book category name such as "Sports & Outdoors—Skiing—General" or "Mystery—General" which could also be displayed.

In accordance with a preferred embodiment of the invention, the Web site system includes software and database components that are used to collect information about the browsing and/or purchasing activities of users, and to use this information to automatically evaluate the popularity levels of specific item nodes and category nodes of the tree. Nodes that are determined to be the "most popular" are automatically elevated for display or "featured" (as described below) at higher levels of the tree. In the preferred embodiment, the only types of categories that are featured are the leaf categories, although higher level categories could be featured in other embodiments. Node popularity levels are preferably determined based on user activity data falling within a sliding window (e.g., data collected over the last two weeks), so that the featured nodes strongly reflect the current trends and fads.

The data collected for the category nodes may include, for example, the number of purchases made within each category, the number of searches performed within each category, click-through counts (the number of times each node was selected by a user), and/or other types of activity data. Where click-through counts are used, click through events that do not result in a purchase, and/or do not represent the user's final destination, may be disregarded or given a lesser weight.

In one embodiment, such data is collected only for the leaf categories, since higher-level categories are not elevated for display. In another embodiment, the data is also collected for the non-leaf categories and is used to "weight" popular items lists (see FIG. 11) during selection of featured books. The data collected for the item nodes preferably includes purchase data (the number of times each item was purchased), and may additionally or alternatively include other types of data such as the number of times each item was viewed, rated, reviewed, or placed into a online shopping cart.

The popularity levels of the nodes can be determined by evaluating the collected data on a collective basis (without regard to user identity), on an individual basis, or both. Where only collective evaluation is performed, the items and leaf categories that are featured at any given node of the tree are the same for all users. Where the data is collected and evaluated on an individual basis, the items and leaf categories that are featured at each node are specific to the historical actions performed by the particular user. For example, the popularity levels may reflect the user's affinities for particular items as predicted by a collaborative filtering, content-based filtering, or other algorithm for generating personal recommendations. An example of a recommendation algorithm that can be used for this purpose is described in U.S. patent application Ser. No. 09/157,198, filed Sep. 18, 1998, the disclosure of which is incorporated herein by reference. In the embodiment set forth below, a combination of collective and individual evaluation is used, so that the featured nodes are dependent upon both the actions of the particular user and the actions of the community as a whole.

The nodes may additionally or alternatively be evaluated on a community-by-community basis, and elevated based on membership within such communities. For example, the nodes that are featured for a particular user may be based solely on the historical actions of the members of the communities to which the user belongs. The communities may include "explicit membership" communities (communities that users explicitly join) and/or "implicit-membership" communities (communities for which membership is based on information known about the user, such as the user's email domain, Internet service provider, purchase history, or shipping address).

FIG. 1A illustrates an example Web page that includes an example set of featured book categories 110 and featured book titles 120. As depicted by the figure, the "featured" book categories 110 and "featured" book titles 120 are derived from the "Sports & Outdoors" branch of the browse tree which is the branch currently selected for viewing. For example, the category "Olympics" is featured even though it is actually found under the following path: Books\Sports & Outdoors\Events\Olympics, and the book "Wayne Gretsky: A Hockey Hero" is featured even though it would be found under the following path: Books\Sports & Outdoors\Hockey. The featured books and categories are displayed as respective hyperlinks that provide a direct path to the corresponding books and categories. This gives the user quicker access to the most popular leaf categories and books. For example, selection of a link for a featured book causes the book's detail page to be displayed, and selection of a link for a featured leaf category causes the list of books falling under that category to be displayed.

The Web page also provides links 130 to the immediate subcategories of the selected book category in alphabetical order. Although the featured items and categories are featured explicitly in FIG. 1A, they could alternatively be featured implicitly as regular entries on the page. For example, the featured leaf categories 110 and could simply be displayed as part of the list 130 of subcategories.

As the user moves further into the browse tree, the "featured" book categories and book titles adjust such that the most popular leaf categories and book titles falling within the selected category are displayed. Preferably, the featured books are displayed as such only at levels of the tree at which the book titles are not visible, and featured categories are displayed as such only at levels at which leaf categories are not visible. Thus, the effect is to expose to the user, or to "elevate" within the tree, popular book titles and categories that would not otherwise be visible at the current level. Elevation preferably occurs only along child-parent paths, so that a node will only be featured in association with its parent nodes. In the preferred embodiment, the elevated nodes can also be accessed by navigating downward to the "fixed" positions of such nodes. Thus, the process of elevating popular nodes preferably involves copying, as opposed to moving, the nodes to higher levels of the tree. In other embodiments, the nodes may actually be moved within the browse tree.

When the user selects a leaf category to view a corresponding list of book titles, the most popular book titles within that category may optionally be highlighted (not illustrated), such as by displaying them at the top of the list or in a particular color. Similarly, when the user selects a category that contains only leaf categories, the most popular leaf categories in the list may optionally be highlighted (not shown) in the same or a similar manner.

In one embodiment, the leaf categories and book titles to be featured (elevated) are automatically selected based upon a popularity score which reflects activity from a collection of users as well as activity from the specific user viewing the page. As indicated above, the nodes may alternatively be elevated based solely on one of these two classes of user activity. In addition, the nodes could be elevated based in-whole or in-part on the actions of the members of one or more communities to which the user belongs. The score preferably gives more weight to activities that are deemed the most indicative of users' affinities for specific categories and items. For example, an actual purchase of an item is preferably given more weight than merely placing the item in the shopping cart. In addition, activity from the current user is preferably given more weight than activity of other individual users.

In addition to node popularity levels, other types of criteria may be used to select the nodes to be elevated. For example, a bias can be added to node selection process to cause newly added items and/or leaf categories to be elevated more frequently than other types of nodes.

As described below, the task of processing historical data to evaluate book and category popularaties is preferably performed offline (i.e., not in response to page requests), and the results stored in one or more tables or other data structures. This allows the featured book titles and categories to be selected for each user in a timely manner. In other embodiments, however, some or all of such processing can be performed in real-time in response to page requests.

In general, the types of criteria that may be used to elevate nodes depends upon the nature and function of the particular browse structure. For example, in an online auctions embodiment in which the nodes represent auction events, the nodes may be elevated based in-whole or in-part on the number or frequency of bids. Other auction-related criteria, such as the number of bidders, the average bid increment, the difference between the current bid and the asking price, and/or the average rating of the seller may additionally or alternatively be used.

Figure 1B:
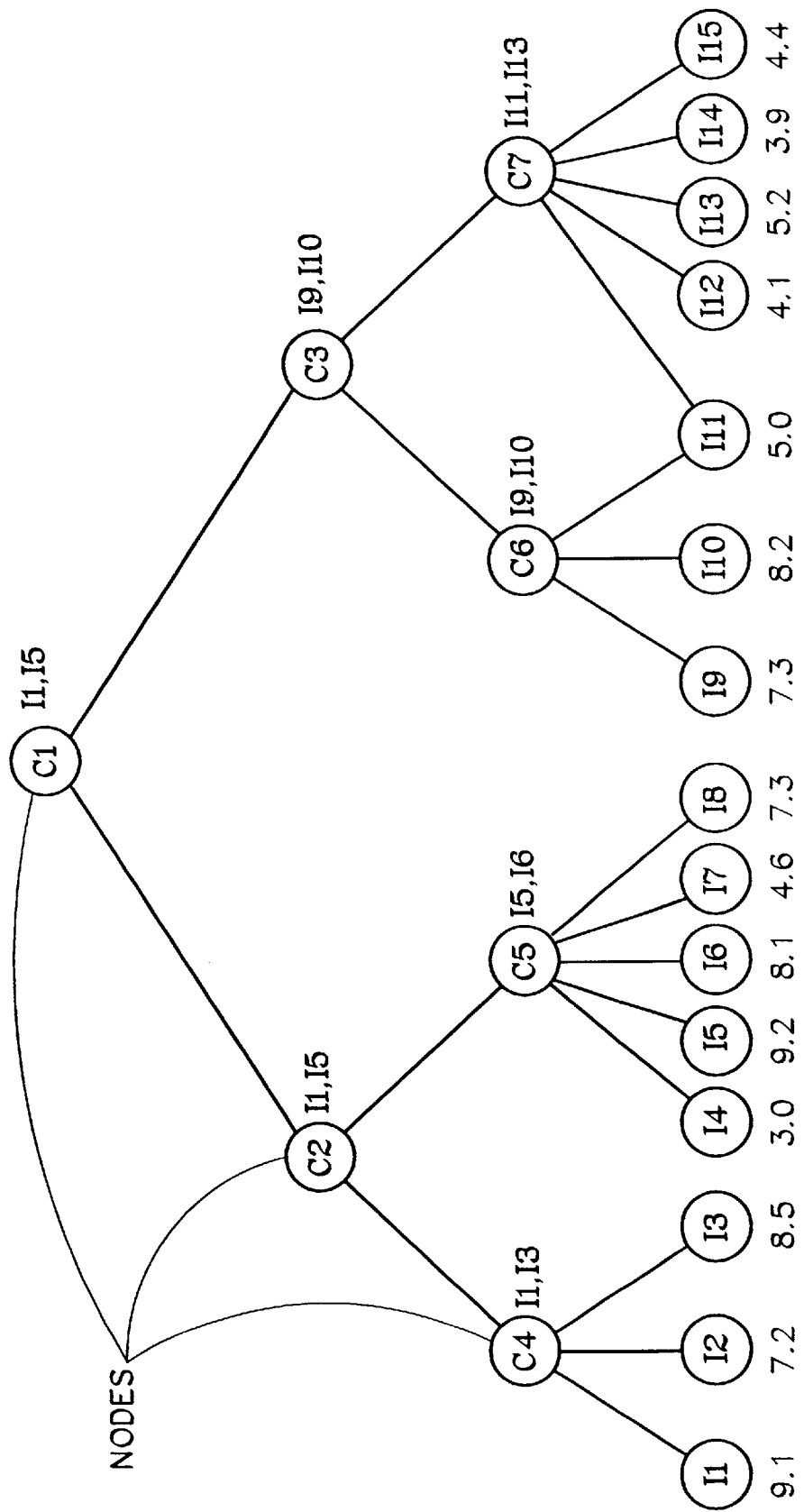
FIG. 1B illustrates and example browse tree, with item popularity scores shown below the respective items.

FIG. 1B illustrates a simple browse tree, and will be used to describe a preferred process for elevating items for display. The same method may be used to elevate categories. The tree consists of seven category nodes, C1–C7, and fifteen item nodes, I1–I15. The numbers listed below the item nodes ("items") are their respective popularity scores, on a scale of 1–10. As indicated above, these scores may be based on activity data collected for a particular user, a set of communities of which the user is a member, the general user population, or a combination thereof.

Assuming that the top two items (items with the highest scores) are selected for elevation at each category node, the items are elevated for display as shown to the right of each category node. For example, items 5 and 6 are elevated for display at category 5 since they have the highest scores of all items falling within category 5; and items 9 and 10 are elevated for display at category 3 since they have the highest scores of all items falling within category 3. In this example, items 1 and 5 would be featured both at the root of the tree (e.g., a Web page which lists the top level categories C2 and C3) and at category C2 (e.g., a Web page which lists C4 and C5), and items 9 and 10 would be featured at category C3. When the user navigates down to one of the leaf categories C4–C7 to view a list of items, the elevated items within that category might be highlighted within the list.

As indicated above, a recursive process is preferably used to elevate the nodes within the tree. Table 3 is a pseudocode representation of one such algorithm that may be used to elevate category nodes (referred to as "browse nodes" in Tables 3 and 4). Table 4 is a pseudocode representation of a more generic recursive algorithm that may be used to elevate category nodes or item nodes. The term "item" is used generically in Tables 3 and 4 to refer to both types of nodes.

TABLE 3

```
// A simple recursive algorithm to surface browse node ids, in a
// list which can be sorted.
// Where each "item" in the item list contains two elements:
//    item.id == <browse node id or product id >
//    item.score == < score for comparing and sorting browse nodes or
// product ids)
// This is the recursive function:
surface_list_of_popular_brows_nodes(node_id, list_of_items) {
    if ( is_a_leaf_node(node_id) {
```

TABLE 3-continued

```
            add_item_to_list(list_of_items, node_id,
get_score(node_id)
        }else {
            // If not a leaf node
            for each child_id of node_id {
                surface_list_of_popular_browse_nodes (child_id,
list_of_items)
            }
// Sort list in decreasing order based on the score so highest scores
// are at the beginning of the list.
        list_sort(list_of_items)
}
```

TABLE 4

```
// A more complex (but more generic) alogithm to surface browse nodes
// or individual category elements.
surface_list_of_relevant_items(node_id, list_of_items,
type_of_item_to_surface) {
    if ( is_a_leaf_node(node_id) {
        if (type_of_item_to_surface == browse_node)
            populate_list_with_browse_node_and_score
(list_of_items, node_id, get_score(node_id))
        if (type_of_item_to_surface == item_elements)
            populate_list_with_top_scoring_elements
(list_of_items, top_items_with_score(node_id))
    }else {
        // If not a leaf node
        for each child_id of node_id {
            surface_list_of_relevant_items (child_id, list_of_items,
type_of_item_to_surface)
        }
    }
}
```

II. Web Site Components

Figure 2:
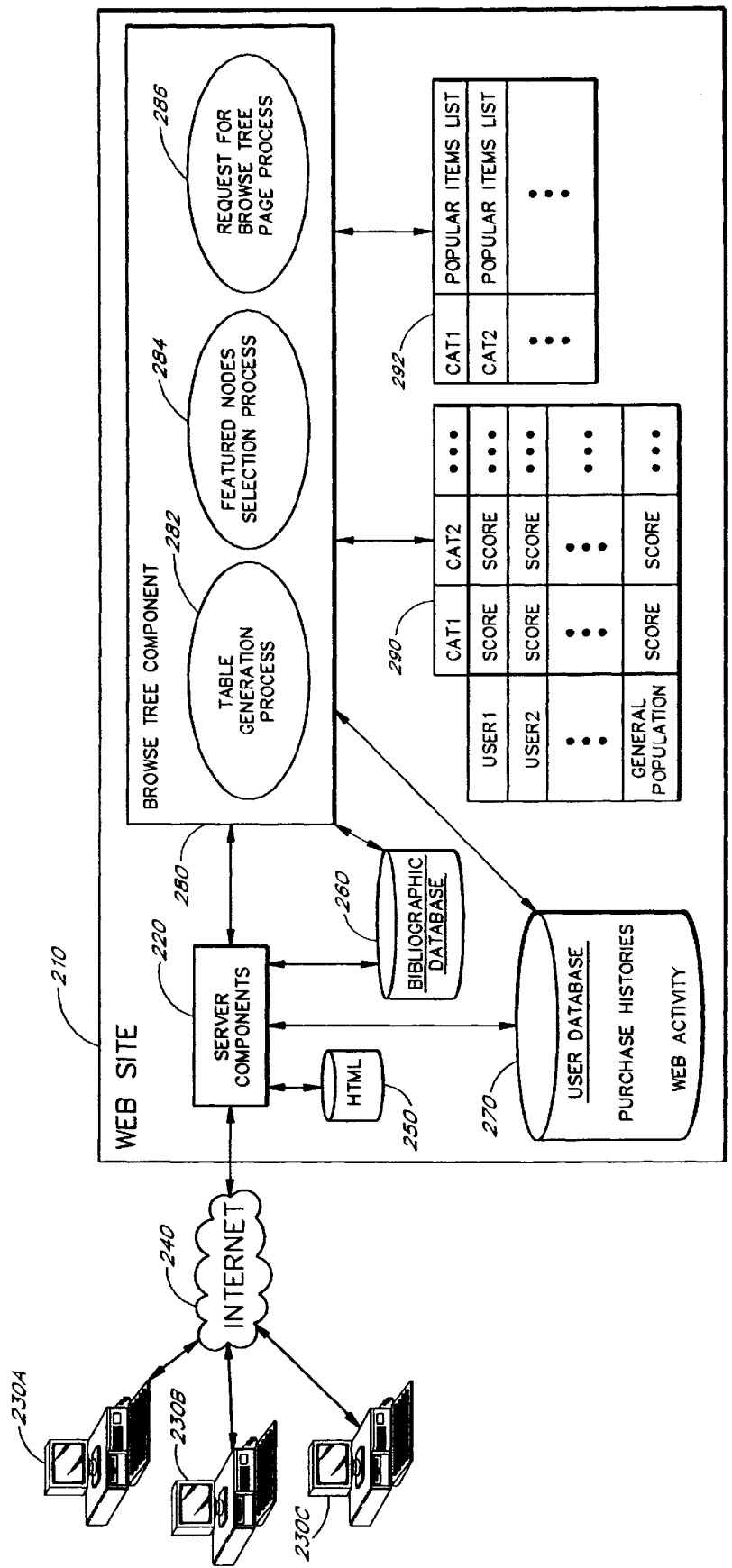
FIG. 2 illustrates a set of Web site components that may be used to identify and elevate book categories and titles within a browse tree according to the invention.

FIG. 2 illustrates a basic set of Web site components that may be used to implement a preferred embodiment of the invention. As will be appreciated by those skilled in the art, the division of functionality between executable components, and the data structures used by these components, are largely a matter of design choice and can be varied significantly without departing from the scope of the invention. Further, the invention need not be implemented in conjunction with a Web site, but be can implemented as part of an online services network (e.g., America Online), interactive television system, network of information appliances, or other type of information system.

The Web site 210 includes various server components 220, including a Web server (not shown), that are used to process requests from user computers 230A–C via the internet 240. The server components 220 access a database of HTML documents 250, a Bibliographic Database 260, a User Database 270, and a Browse Tree Component 280. The Bibliographic Database 260 includes records for the various book titles and other products that are available for purchase from the Web site. The Bibliographic Database 260 also includes information regarding the set of existing categories, how the categories are related to each other, and the categories in which each book title falls.

The User Database 270 includes information about the users of the site and keeps track of their activity. As depicted by FIG. 2, the information stored for each user may include the user's purchase history 272 (if any) and the user's Web activity 274 (if any), and a list of the communities of which the user is a member. The purchase histories 272 keep track of the products that have been purchased by the user and may, for example, be in the form of lists of product identification numbers (such as ISBNs of books) and corresponding dates of purchase. The Web activity 274 keeps track, on a user-specific basis, of certain types of browsing events, such as downloads of book detail pages, book rating events, selections of items for placement in the shopping cart, searches within specific categories, etc. The Web activity data may alternatively be tracked only on a community-specific basis, without regard to user identity. The executable components used to process orders, update the purchase histories and Web activity data, implement shopping carts and the search engine, and perform other sales-related tasks are omitted from FIG. 2 to simplify the drawing.

Some or all of the purchase history and Web activity data may alternatively be stored solely on a collective user basis. For example, for performance reasons, it may be desirable to monitor click-through events only on a non-user-specific basis; this may be accomplished, for example, by providing a counter for each node that is a candidate for elevation, and incrementing the counter whenever the corresponding node is selected for viewing. For illustrative purposes, however, it will be assumed that all of the collected data, including click-through counts, is stored on an individual basis.

The Browse Tree Component 280 includes a Table Generation Process 282, a Featured Nodes Selection Process 284, and a Request for Browse Tree Page Process 286. (The term "process," as used herein, refers generally to a computer program stored in a computer memory, and is also used to refer to the method implemented by the computer program.) The Table Generation Process 282 uses the purchase history and Web activity data to generate a Category Popularity Table 290 and an optional Popular Items Table 292. Other types of data structures may be used in place of the tables 290, 292.

As depicted in FIG. 2, the Category Popularity Table 290 preferably contains a popularity score for each (user, category) pair. This score represents the user's predicted interest in the category based on the user's previous activities. Such scores (referred to as "individual user history scores" or "individual scores") may be generated, for example, for every known user of the Web site, or for a selected subset of users that visit the site on a frequent basis. An algorithm for generating personal recommendations may be used to generate the individual scores. Scores for the non-leaf categories may optionally be omitted. In addition, in embodiments in which featured categories are not selected on a user-specific basis, the individual user history scores may be omitted.

Rather than basing the individual scores on the actions of respective users, the scores may be based on the collective actions of the community or communities to which the user belongs. Example methods which may be used to track user activity on a community-by-community basis are described in U.S. Appl. No. 60/128,557, filed Apr. 9, 1999, the disclosure of which is incorporated herein by reference.

The table 290 also includes popularity scores for the general population, referred to herein as "collective user history scores" or simply "collective scores." The Table Generation Process 282 updates the table 290 periodically, such as once per day, so that the scores strongly reflect the current interests of users. In one preferred embodiment, which is depicted in FIGS. 5–8, the scores are based on several different types of user activities. In other embodiments, the individual and collective scores are based solely on a particular type of activity, such as purchases or click-through counts. As described below, the individual and collective scores are preferably used in combination to select leaf categories for elevation on a user-specific basis. In one embodiment (not illustrated), the table 290 also stores a popularity score for each (community, category) pair, and these community-specific scores are incorporated into the total scores based on community memberships of users.

Because the number of items contained within the catalog is large (several million items), a Popular Items Table 292 is used in the illustrated embodiment to store item popularity data. As depicted in FIG. 2, this table 292 contains a list of the most popular items (e.g., the ten most popular items) within each leaf category (CAT1, CAT2 . . . ). Popular items lists for non-leaf categories may optionally be stored in the table 292 as well. The Table Generation Process 282 preferably generates these popular items lists periodically from purchase history data, and possibly other types of activity data. Each item within each popular items list is preferably stored together with a weight value (not shown) that indicates the popularity of the item. As described below, the popular items lists are preferably used in combination with the individual and collective scores to select items for elevation on a user-specific basis. One benefit to this approach is that it provides customized (user-specific) elevation of items without the need to generate individual scores for the items.

In a second embodiment (not illustrated), the Popular Items Table 292 is omitted, and table 290 is supplemented with the individual and collective scores for some or all of the items in the tree. In this second embodiment, a common node elevation algorithm of the type shown in Table 4 is used to elevate both types of nodes (categories and items).

The Featured Nodes Selection Process 284 uses the information stored in the tables 290 and 292 to select the leaf categories and book titles to be displayed (featured) at higher-level nodes of the browse tree. As indicated above, the featured categories and book titles are preferably selected on a user-specific basis. In one embodiment, the leaf categories and book titles to be displayed to a given user at each higher-level node are determined and are stored in a temporary table when the user initiates a browsing session or begins using the browse tree, and this temporary table is accessed when the user requests an appropriate browse tree page. Thus, the processing and storage burden associated with elevating nodes is avoided for those users who do not access the site or the browse tree during the relevant time period to which the scores correspond. The identity of the user may be determined using cookies, a log-in procedure, or another appropriate identification method.

III. Generation of Popular Items Table

Figure 3:
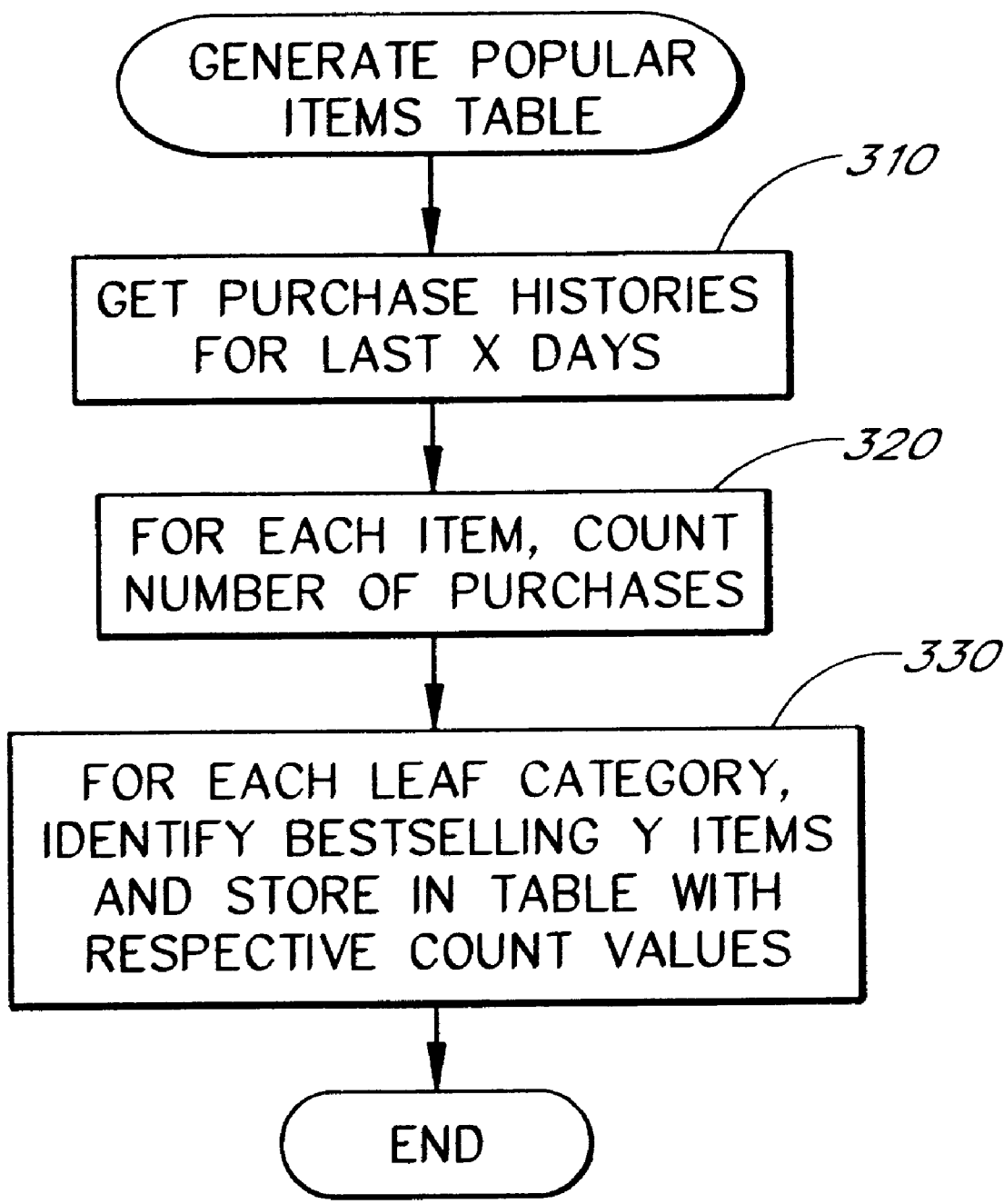
FIG. 3 illustrates a method for generating a table of the top book titles (items) within each leaf category.

FIG. 3 illustrates an algorithm that may be used by the Table Generation Process 282 to generate the Popular Items Table 292. This algorithm is preferably applied to the collected purchase history data periodically (e.g., once per day) to generate new table data. In block 310, the process 282 retrieves from the User Database 270 the purchase histories of all users for the most recent X days (e.g., 2 weeks). In block 320, the process uses this data to count the number of times each item was purchased during the X-day interval. In counting the number of purchases, multiple purchases of the same item by the same user may be counted as a single purchase. In addition, different media formats (hardcover, paperback, electronic, etc.) of the same title may be treated as a single "item." Further, rather than re-counting the full two weeks worth of purchase history data, the process can simply count the purchases made during the last day (or other appropriate internal) and then combine these results with those generated for the prior X−1 days.

In block 330, the process uses the purchase counts generated in block 320 to identify the best-selling Y items (e.g., 10 items) in each leaf category. Each such list of best-selling items, together with the corresponding purchase count values, is then recorded in the table 292 as a popular items list. The method of FIG. 3 can optionally be extended to generate popular items lists for non-leaf categories.

Although the process used in FIG. 3 uses purchase count as the sole criteria for evaluating item popularity, other types of criteria may additionally or alternatively be used. For example, an item's popularity may be measured based on the number times the item was viewed, rated, searched for, downloaded, or placed into a shopping cart. The specific types of criteria that are available for use will generally depend upon the type of item involved and the nature of the electronic commerce system.

IV. Generation of Category Popularity Table

Figure 4:
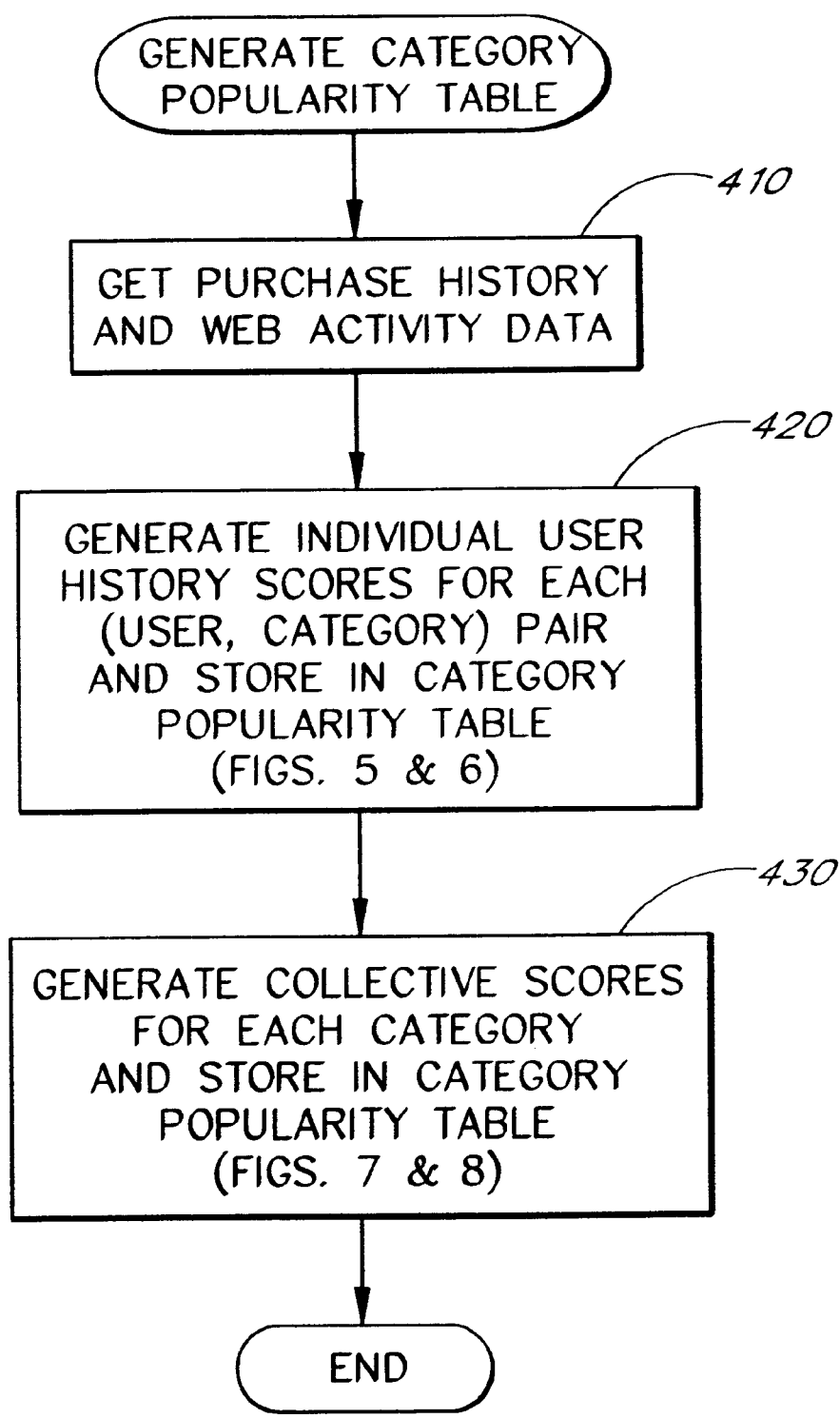
FIG. 4 illustrates a method for generating scores that represent user-specific and collective popularity levels of specific leaf categories.

FIG. 4 illustrates an algorithm that may be used by the Table Generation Process 282 to generate the Category Popularity Table 290. This algorithm is preferably applied to the collected purchase history and Web activity data periodically (e.g., once per day) to generate new table data. As will be apparent from the description, the same or a similar algorithm could be used to score items.

In block 410, the process 282 retrieves the purchase history and Web activity data from the User Database 270. In block 420, the process uses this data to generate individual user history scores for each (user, leaf category) pair, and stores the resulting scores in the Category Popularity Table 290. The details of block 420 are set forth in FIGS. 5 and 6 and are discussed below. In embodiments in which non-leaf categories are elevated, scores may also be generated for the non-leaf categories.

In addition, as indicated above, the individual scores may alternatively be generated using data collected on a community-by-community basis, together with information about the communities to which the user belongs. For example, if User A belongs to communities B, C and D, the individual scores for User A can be generated based on collective activity data for communities B, C and D. With this method, there is no need to collect activity data on a user-specific basis.

Figure 7:
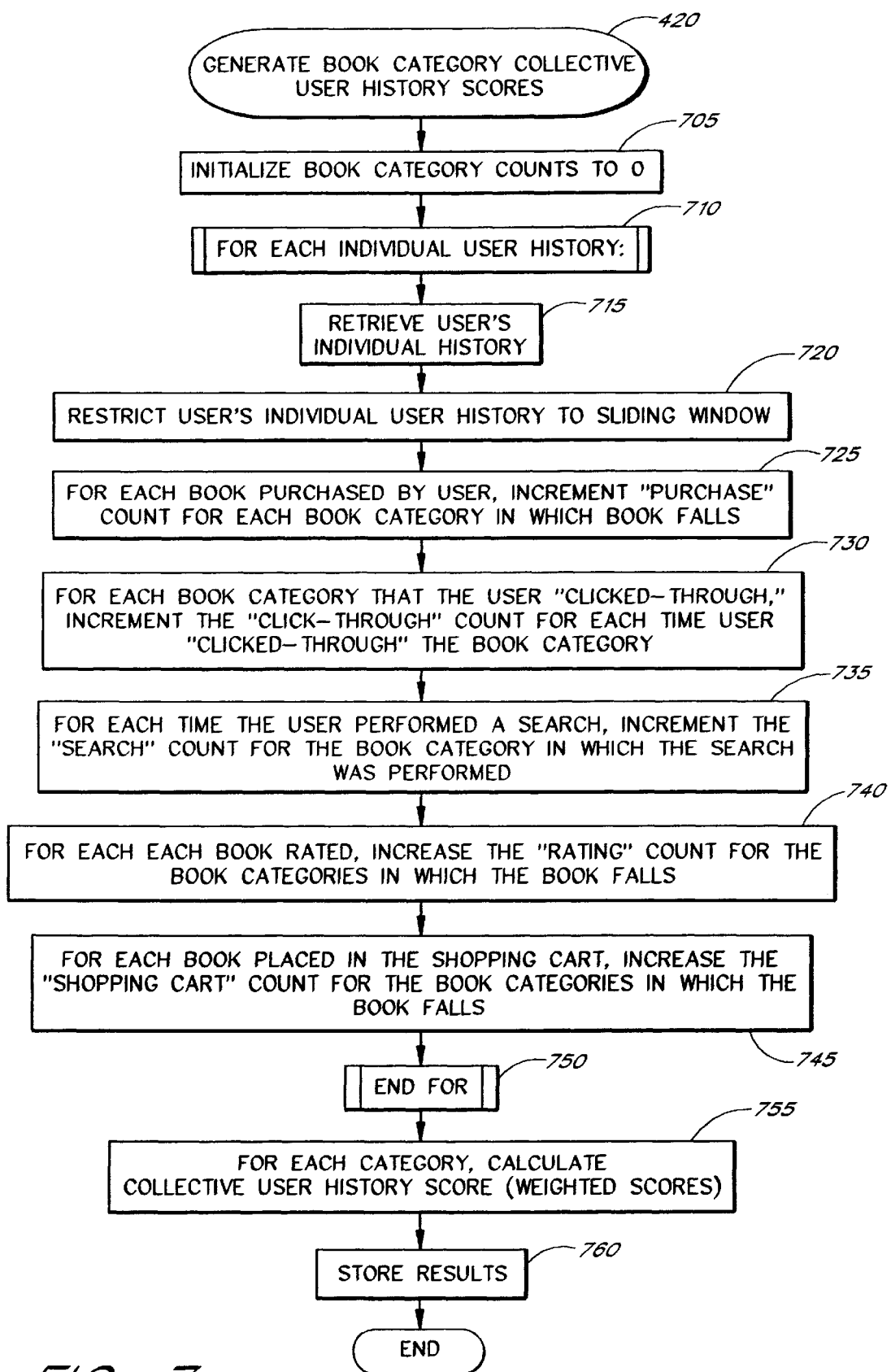
FIG. 7 illustrates a method for generating the collective scores.

In block 430, the process 282 evaluates the purchase history and Web activity data on a collective basis to generate the collective scores for each leaf category, and stores the resulting scores in the table 290. The details of block 430 are illustrated in FIGS. 7 and 8 and are discussed below. In an alternative embodiment, the collective scores are generated by summing the individual scores within each leaf category. In embodiments in which non-leaf categories are elevated, collective scores may also be generated for the non-leaf categories.

Figure 5:
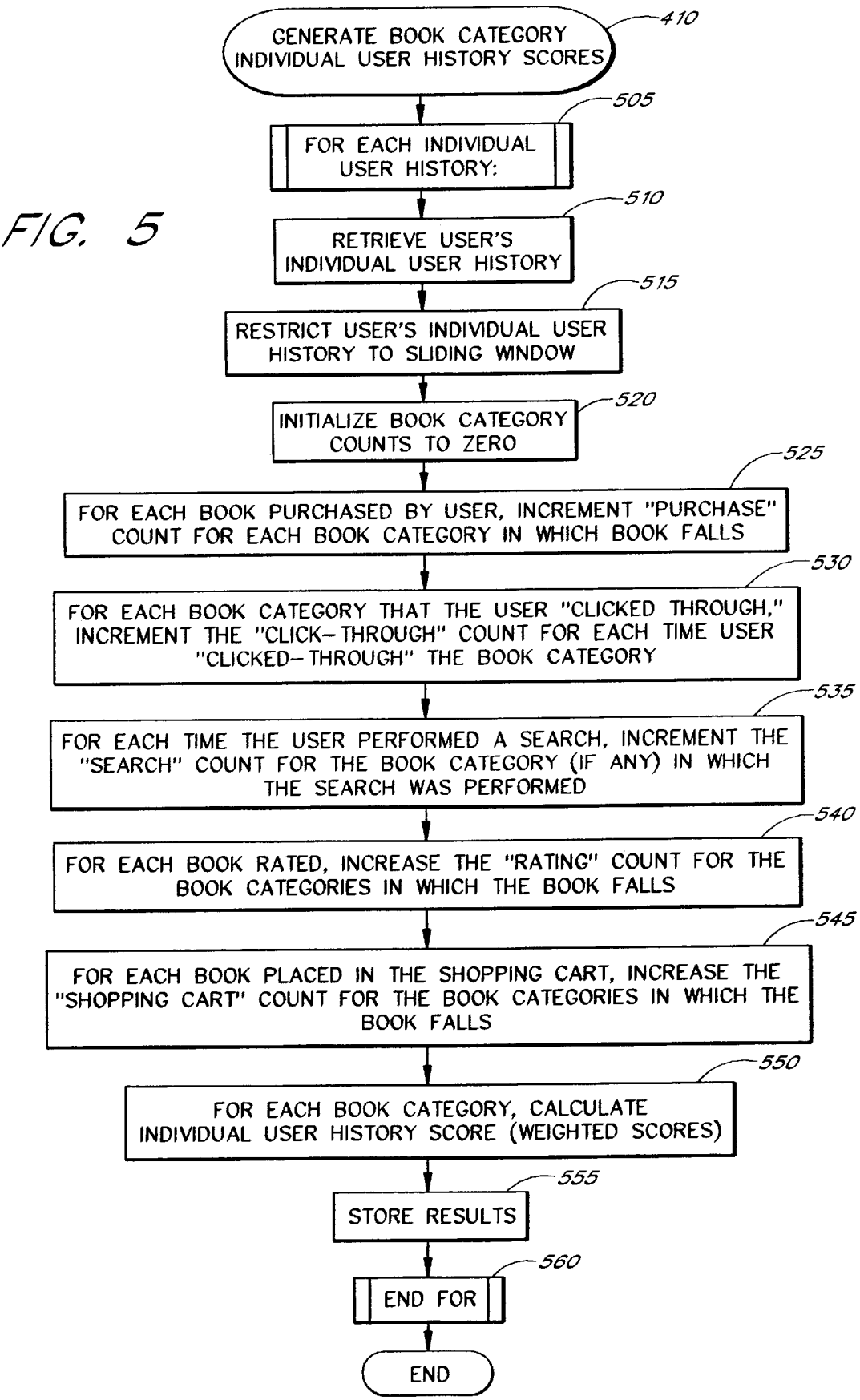
FIG. 5 illustrates one method for generating the user-specific scores.

FIGS. 5 and 7 illustrate examples scoring methods that can be used to generate the individual and collective scores, respectively. The user activities listed in these figures are merely representative of some of the types of activity data that can be incorporated into the scoring method, and are not necessarily the best indicators of user affinity levels.

As illustrated in FIG. 5, to generate the individual user history scores for each (user, category) pair, the purchase history and Web activity data (collectively "user history") are processed on a user-by-user basis (blocks 505 and 560). First, an individual user history is retrieved (block 510). Next, the individual user history information is preferably restricted to user activity performed within a sliding window (block 515), such as the most recent three months. This window size could be selected dynamically based on the quantity of recent purchase history data available for the user. The book category count for each type of user activity is then initialized to zero (block 520). For each book purchased by the user, the "Purchase" count for each book category in which the book falls is incremented (block 525).

For each book category the user "clicked-through" during browsing of the tree, the "Click-Through" count is incremented (block 530). Click-through events that did not result in purchases, and/or did not represent the user's destination, may be ignored. Well-known log tracing techniques may be used to determine the user's actions following a click-through event.

For each book category in which the user performed a search, the "Search" count is incremented (block 535). For each book that the user rated, the "Rating" count is incremented (block 540) for all book categories in which the book falls. For each book placed in the shopping cart, the "Shopping Cart" count is incremented for each book category in which the book falls (block 545). In other embodiments, other user activity may also be counted. In addition, any one of the foregoing types of activity, or a different type of activity, could be used as the exclusive indicator of item popularity. As with the FIG. 3 algorithm, the count values may be generated only for the period of time since the last execution of the algorithm (e.g., the last day), and the results combined with prior results data.

Once the process 282 has gone through all relevant user activity, the process calculates a final score based upon predetermined weights for each book category count (block 550).

TABLE 5

| Purchase | 210 |
| --- | --- |
| Click-through | 201 |
| Search | 203 |
| Rating | 208 |
| Shopping Cart | 207 |

The predetermined weights reflect preferential user activity. For example, actual purchases are preferably given more weight than merely placing an item in a shopping cart. The weights may be adjusted by system administrators to "tune" the system. Table 5 illustrates sample weights for some types of individual user activity. Other weights or an equally-weighted approach could be used. Table 6 illustrates how the score is calculated for each category using the predetermined weights of Table 5.

in Table 6. Preferably, only the weighted scores are stored in the table 290, and the other scores are stored only temporarily during generation of the weighted scores.

As illustrated in FIG. 7, to generate the collective user history scores, first, the book category count for each type of user activity is initialized to zero (block 705). Then, an individual user history is retrieved (block 715). Next, the individual user history information is preferably restricted to user activity performed within a sliding window (block 720), preferably the most recent two weeks. The use of a shorter window than the window used for individual scores is justified by the greater quantity of data used to generate the collective scores. In other embodiments, other restrictions can be added. For example, the process could restrict the set of individual user histories to those whose ages are over fifty-five or to user activity performed after midnight. Next, for each book purchased by the user, the "Purchase" count is incremented for each book category in which the book falls (block 725). For each book category the user "clicked-through," the "Click-Through" count is incremented (block 730). For each book category in which the user has performed a search, the "Search" count is incremented (block 735). For each book that the user rated, the "Rating" count is incremented for each book category in which the book falls (block 740). For each book placed in the shopping cart, the "Shopping Cart" count is incremented (block 745) for each book category in which the book falls. In other embodiments, the process could also account for other user activity, or could use only a subset of the types of activity listed in FIG. 7.

Once the process has gone through all relevant user activity, the process continues onto the next user (blocks 710, 750) and repeats until all user histories have been traversed. As with the FIG. 3 algorithm, the count values may be generated only for the period of time since the last execution of the algorithm (e.g., the last day), and the results combined with prior results data. Further, the algorithms of FIGS. 5 and 7 can be appropriately combined (implemented concurrently) to reduce the processing burden.

After all user histories have been traversed, a final score is calculated (block 755) based upon predetermined weights for each book category.

TABLE 6

| Book Category | Purchase (210) | | Click-Through (201) | | Search (203) | | Rating (208) | | Shopping Cart (207) | | Weighted Scores |
| --- | --- | --- | --- | --- | --- | --- | --- | --- | --- | --- | --- |
| Air Sports & Recreation | (0 * 210) | + | ( 0 * 201) | + | ( 0 * 203) | + | ( 0 * 208) | + | (0 * 207) | = | 0 |
| Audio books | (3 * 210) | + | (24 * 201) | + | (35 * 203) | + | ( 3 * 208) | + | (7 * 207) | = | 14632 |
| Automotive | (0 * 210) | + | (19 * 201) | + | (21 * 203) | + | ( 0 * 208) | + | (0 * 207) | = | 8082 |
| ... | | | | | | | | | | | |
| Reference | (0 * 210) | + | ( 0 * 201) | + | ( 0 * 203) | + | ( 0 * 208) | + | (0 * 207) | = | 0 |
| Scuba | (0 * 210) | + | ( 0 * 201) | + | ( 0 * 203) | + | ( 0 * 208) | + | (0 * 207) | = | 0 |
| Swimming | (8 * 210) | + | (73 * 201) | + | (57 * 203) | + | (12 * 208) | + | (6 * 207) | = | 31662 |
| Yoga | (0 * 210) | + | ( 0 * 201) | + | ( 0 * 203) | + | ( 0 * 208) | + | (0 * 207) | = | 0 |

Next, the weighted scores (individual user history scores) for the user are stored in the Category Popularity Table 290 (block 555). The scores could alternatively be stored in the User Database 270 (as part of the user's profile), as a cookie stored by the user's computer, or elsewhere. The process then moves on to the next individual user history and repeats until it reaches the last individual user history (blocks 505, 560).

FIG. 6 shows an example set of scores 610 after the process has finished. As illustrated, the weighted scores for User #128928753 in FIG. 6 correspond to those calculated

TABLE 7

| Purchase | 10 |
| --- | --- |
| Click-through | 1 |
| Search | 3 |
| Rating | 8 |
| Shopping Cart | 7 |

As with the individual scores, the predetermined weights used for collective scores reflect preferential user activity and can be adjusted by system administrators to tune the system. Table 7 illustrates sample weights for some types of collective user activity. The collective user activity is preferably weighted less than individual user activity. It is recognized, however, that other weights or an equally-weighted approach could be used. In addition, the scores could alternatively be based solely on a particular type of activity such as click-through events. Table 8 illustrates how the score is calculated for each category using the predetermined weights of Table 7.

TABLE 8

| Book Category | Purchase (10) | | Click-Through (1) | | Search (3) | | Rating (8) | | Shopping Cart (7) | | Weighted Scores |
|---|---|---|---|---|---|---|---|---|---|---|---|
| Air Sports & Recreation | ( 564 * 10) | + | ( 616 * 1) | + | (1055 * 3) | + | ( 61 * 8) | + | ( 57 * 7) | = | 16009 |
| Audio books | (2016 * 10) | + | (8465 * 1) | + | (2461 * 3) | + | ( 248 * 8) | + | ( 189 * 7) | = | 39315 |
| Automotive | (5354 * 10) | + | (7715 * 1) | + | (3403 * 3) | + | (1127 * 8) | + | (2092 * 7) | = | 95124 |
| ... | | | | | | | | | | | |
| Reference | ( 715 * 10) | + | ( 946 * 1) | + | (1035 * 3) | + | ( 183 * 8) | + | ( 247 * 7) | = | 14394 |
| Scuba | ( 226 * 10) | + | ( 546 * 1) | + | ( 887 * 3) | + | ( 311 * 8) | + | ( 302 * 7) | = | 10069 |
| Swimming | (3452 * 10) | + | (4652 * 1) | + | (4512 * 3) | + | ( 415 * 8) | + | ( 521 * 7) | = | 59675 |
| Yoga | (1530 * 10) | + | ( 765 * 1) | + | ( 996 * 3) | + | ( 534 * 8) | + | ( 454 * 7) | = | 26503 |

Next, the weighted scores (collective user history scores) are stored in the Category Popularity Table 290. FIG. 8 shows an example set of scores 810 after the process has finished. As illustrated, the weighted scores in FIG. 8 correspond to those calculated in Table 8. Preferably, only the weighted scores are stored in the table 290, and the other scores are stored temporarily during generation of the weighted scores.

As indicated above, one or both of the methods illustrated in FIGS. 5 and 7 could be extended to generate individual and/or user history scores for specific items of the catalog. This would provide an alternative method for evaluating popularity levels of specific book titles. To reduce the storage and processing burden, however, the method of FIG. 3 may be used.

V. Elevation of Leaf Categories and Book Titles

The Feature Nodes Selection Process 284 may be initiated when a user performs a particular type of action, such as initiating a browsing session or requesting a page of the browse tree. For example, the nodes to be featured may be determined for the entire tree (using the previously-generated scores) when the user initially accesses the tree, and the results cached in a table or other data structure during the browsing session. As the user navigates the browse tree, this table may be accessed to look up the featured categories and books. The categories and books to be featured could alternatively be determined off-line whenever new scores become available.

Figure 9:
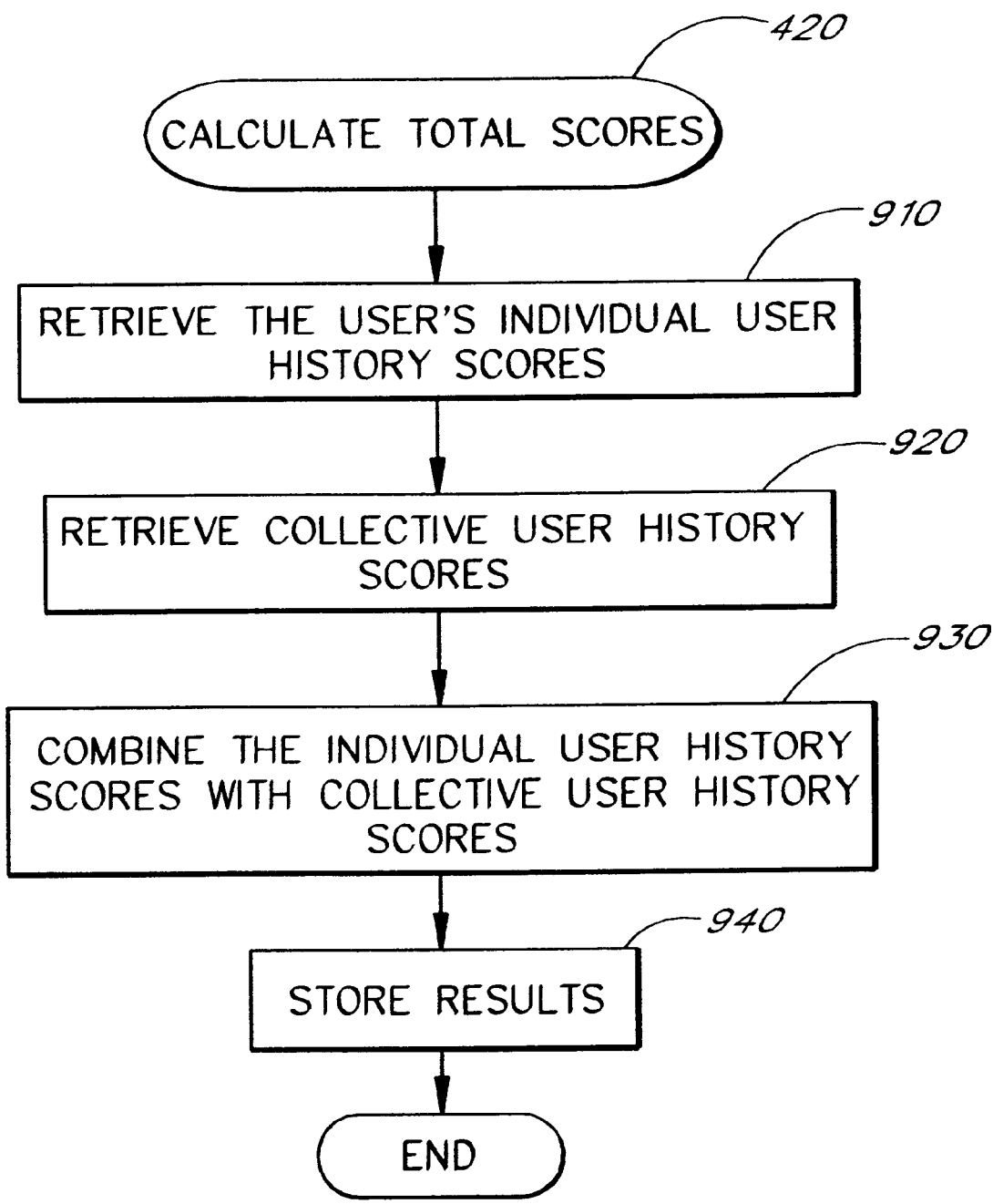
FIG. 9 illustrates a method for calculating total scores from collective and user-specific scores.

As depicted by FIG. 9, the first step of the selection process involves combining the user's individual user history scores (if any) with corresponding collective user history scores to generate total scores. If no individual scores exist for the user, a set of default individual scores may be used, or the collective scores may be used as the total scores. As described below, the total scores are subsequently used to identify leaf categories and book titles to be elevated. In blocks 910 and 920, the user's individual scores and the collective scores are retrieved from the Category Popularity table 290. Then for each entry, the individual user history score is combined with the collective user history score (block 930). In other embodiments, the process may give more weight to the individual user history scores. The results are stored in a temporary table or other data structure (block 940). FIG. 10 shows how the individual and collective scores are combined for an example set of values.

In a first embodiment, the method shown in FIG. 9 is applied only to the leaf category nodes, and not to the item nodes. One of the recursive algorithms shown in Tables 3 and 4 is then used to elevate the category nodes, and the process shown in FIG. 11 (described below) is used to elevate the items nodes. One benefit of this first embodiment is that it does not require individual or collective scores to be generated for the items in the tree. In a second embodiment, in which collective and individual scores are also generated for the items, the FIG. 9 method is applied to both types of nodes (items and categories), and the recursive algorithm shown in Table 4 is used to select both types of nodes for elevation.

Figure 11:
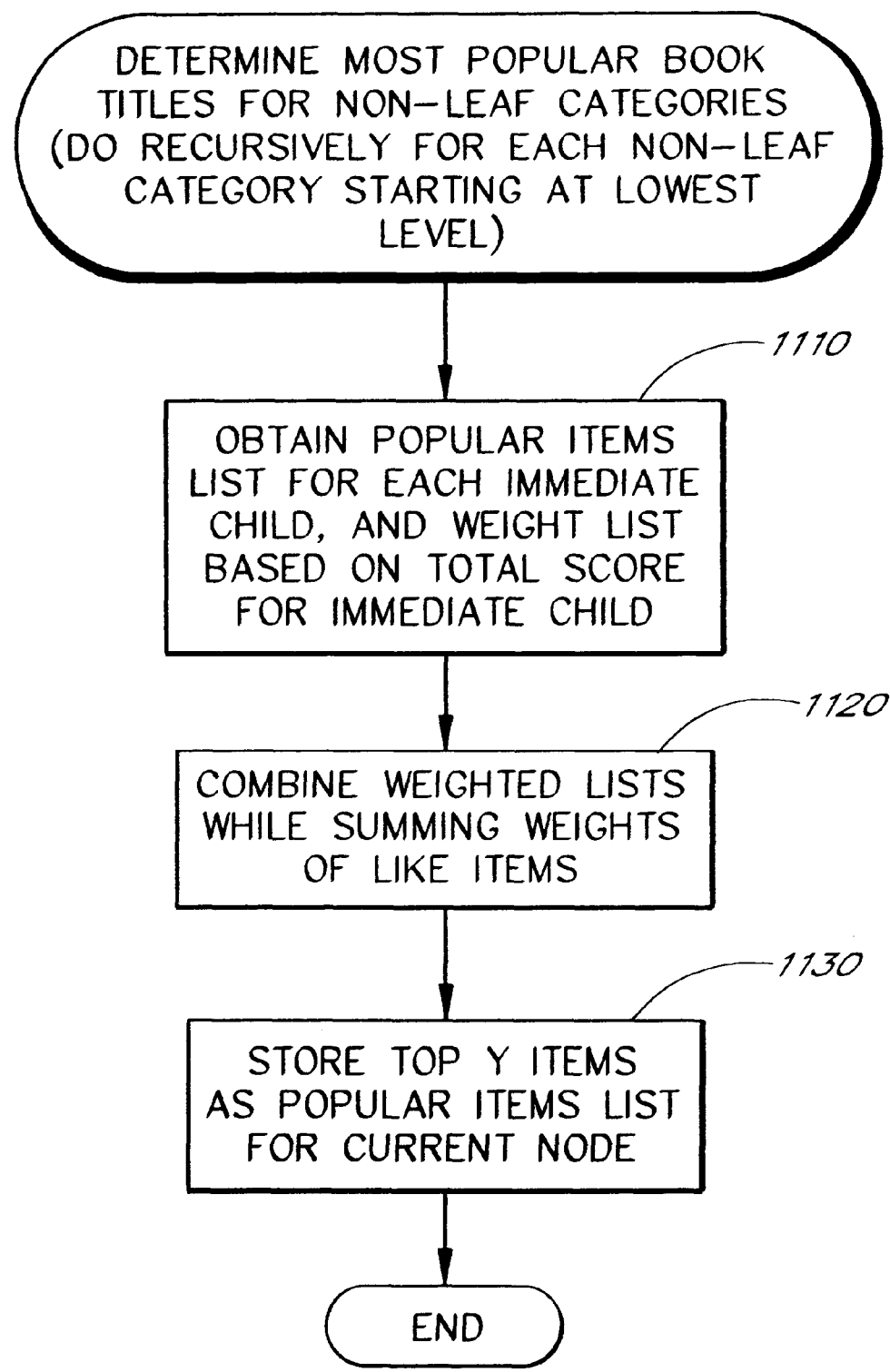
FIG. 11 illustrates a method for recursively selecting, for a particular user, the top titles corresponding to each non-leaf category of the browse tree.

FIG. 11 illustrates an algorithm that may be used to identify the most popular items (book titles) corresponding to each category node of the tree without the need to generate individual or collective scores for the items. Because the most popular items corresponding to the leaf categories are already known (i.e., are stored in the Popular Items Table 292), this algorithm is preferably applied only to the non-leaf categories. The algorithm operates recursively, starting at the lowest applicable level, and proceeding successively to higher levels until the last node is reached. To customize the featured items to the particular user, the total scores generated by the FIG. 9 process are used to weight the popular items lists. As indicated above, the featured items could alternatively be selected without regard to user identity.

In block 1110, the process obtains the popular items lists for each immediate child node of the current node. If the immediate child is a leaf category node, the popular items list is read directly from the Popular Items Table 292; otherwise, the popular items list is obtained from a temporary table generated from previous iterations of the FIG. 11 process. As depicted in block 1110, each list is preferably weighted based on the total score for the respective child to customize the selection process for the particular user. This may be accomplished, for example, by multiplying the total score by the weight value of each item in the list. In block 1120, the weighted lists are combined while summing the weights of like items. The Y items with the highest weights are then stored in a temporary table as the popular items list for the current node (block 1130). If the user selects this node for viewing during the browsing session, some or all of these Y items may be displayed as featured book titles. The process then proceeds to the next category (not shown), or else terminates if the root node has been reached.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims.

What is claimed is:

1. A system for facilitating browsing of hierarchical browse structure that comprises a plurality of nodes, wherein leaf nodes represent items and non-leaf nodes represent item categories, the system comprising:

a tracking component that monitors and records user actions of a plurality of users to generate user activity data, said user actions including actions reflective of user affinities for specific nodes of the hierarchical browse structure;

an analysis component that analyzes the user activity data and generates scores for specific nodes of the hierarchical browse structure; and a node elevation component that uses the scores to select specific nodes of the hierarchical browse structure to elevate for display to users;

wherein, by elevating a selected node for display to a user, the node elevation component enables the user to view the selected node during browsing of the hierarchical browse structure without drilling down within the hierarchical browse structure to a level of the selected node.

2. The system as in claim 1, wherein the analysis component periodically regenerates the scores such that the scores reflect most recently recorded sets of user activity data, whereby different nodes are selected for elevation in different time periods according to changes in user browsing patterns.

3. The system as in claim 1, wherein the node elevation component elevates the selected nodes along parent-child paths of the hierarchical browse structure.

4. The system as in claim 1, wherein the scores generated by the analysis component reflect current popularity levels of the nodes among the plurality of users.

5. The system as in claim 1, wherein the analysis component generates community-specific sets of said scores for each of a plurality of user communities, and wherein the node elevation component selects nodes to elevate for a given user based on a set of scores corresponding to a user community of which the given user is a member.

6. The system as in claim 1, wherein the analysis component generates user-specific scores, and the node elevation component uses the user-specific scores to personalize selections of nodes to elevate for users.

7. The system as in claim 1, wherein the node elevation component selects leaf nodes to elevate for display in conjunction with a non-leaf category node at least in-part by identifying a set of leaf nodes that fall below the non-leaf category node; and selecting a subset of said set of leaf nodes to elevate.

8. The system as in claim 1, wherein the nodes selected for elevation by the node elevation component include leaf nodes that represent respective items.

9. The system as in claim 1, wherein the nodes selected for elevation by the node elevation component include nodes that represent respective item subcategories.

10. The system as in claim 1, wherein the hierarchical browse structure is a directed acyclic graph structure.

11. The system as in claim 1, wherein the node elevation component selects nodes to elevate recursively on a node-by-node basis.

12. A computer-implemented method for facilitating browsing of a hierarchical browse structure in which each node represents an item or an item category, the method comprising:

monitoring at least one type of user activity that is indicative of user affinities for particular nodes of the hierarchical browse structure;

generating scores using data collected during said monitoring, the scores reflecting at least one of (a) popularity levels of particular nodes, and (b) predicted user affinities for particular nodes; and based at least in-part upon on the scores, elevating selected nodes along parent-child paths of the hierarchical browse structure for display;

wherein, by elevating a node, the method enables a user to view the node during browsing of the hierarchical browse structure without having to navigate down to a level of the node within the hierarchical browse structure.

13. The method as in claim 12, wherein generating scores comprises periodically processing user activity data collected over a selected period of time to generate scores reflective of current node popularity levels.

14. The method of claim 12, wherein the browse structure is a directed acyclic graph structure.

15. The method as in claim 12, wherein monitoring at least one type of user activity comprises tracking online purchases of items.

16. The method as in claim 12, wherein generating scores comprises applying a recommendation algorithm to activity data collected for a particular user to generate user-specific scores.

17. The method as in claim 12, wherein elevating selected nodes comprises selecting nodes to elevate on a user-specific basis.

18. The method as in claim 12, wherein elevating selected nodes comprises:

identifying a set of leaf nodes that fall below a current node being accessed by a user; and selecting a subset of said set of leaf nodes to elevate for display in conjunction with the current node.

19. The method as in claim 12, wherein the method comprises generating sets of said scores separately for each of a plurality of user communities, and using a set of scores associated with each community to elevate nodes for members of that community, whereby nodes are elevated differently for different users.

20. The method of claim 12, wherein the selected nodes elevated for display include nodes that represent respective items.

21. The method of claim 20, wherein at least some of the items are auctions.

22. The method of claim 12, wherein the selected nodes elevated for display include nodes that represent respective item subcategories.

23. A computer system that embodies the method of claim 12.

24. A web page generated in accordance with the method of claim 12, the web page including a representation of a first node of the hierarchical browse structure, and further including a representation of a second node that has been elevated for display in conjunction with the first node.

25. A system for facilitating browsing of an electronic catalog of items, the system comprising:

a database which contains information about a plurality of items;

a hierarchical browse structure represented within a server system that provides user access to the database, wherein items from the database are arranged within the hierarchical browse structure according to a hierarchy of item categories, and wherein the hierarchical browse structure is interactively browsable by users to locate items according to the hierarchy of item categories;

a first process which tracks at least one type of user activity that is reflective of user affinities for particular items in the hierarchical browse structure to generate item popularity data; and a second process which uses at least the item popularity data to elevate items for display to expose popular items to users during viewing of non-leaf categories of the hierarchical browse structure.

26. The system of claim 25, wherein the hierarchical browse structure is a directed acyclic graph.

27. The system of claim 25, wherein the first process additionally tracks at least one type of user activity that is reflective of user affinities for particular categories of items to generate category popularity data, and the second process further uses the category popularity data to select items to elevate.

28. The system of claim 27, wherein the second process further uses the category popularity data to select leaf categories to elevate for display.

29. The system of claim 25, wherein the second process uses user-specific data to elevate items on a user-specific basis, so that items are elevated differently for different users of the hierarchical browse structure.

30. The system of claim 25, wherein the first process periodically uses activity data collected over a selected period of time to generate item popularity data that reflects current interests of users.

31. The system of claim 25, wherein the second process elevates the items for display along parent-child paths of the hierarchical browse structure.

32. A method of assisting users in browsing a hierarchical browse structure in which items are arranged by category, said hierarchical browse structure including multiple levels of categories, and being browsable by users to locate specific items within a database of items, the method comprising:

monitoring user actions that are reflective of user affinities for particular items in the hierarchical browse structure, said user actions including actions of a plurality of users;

analyzing user activity data resulting from said monitoring of user actions to generate item popularity data reflective of current popularity levels of specific items of the hierarchical browse structure among said plurality of users; and when a user accesses a non-leaf category of said hierarchical browse structure, selecting, from a set of items that fall below the non-leaf category within the hierarchical browse structure, at least one item to present to the user based at least in-part on the item popularity data.

33. The method of claim 32, wherein said set of items consists of items that are non-immediate children of the non-leaf category.

34. The method of claim 32, wherein the item popularity data is based at least in-part on item selection actions of users during navigation of the hierarchical browse structure.

35. The method of claim 32, wherein the at least one item is selected to present to the user based further upon a profile of said user.

36. The method of claim 32, wherein analyzing the user activity data comprises periodically analyzing a most recent set of the user activity data.

37. The method of claim 32, wherein the hierarchical browse structure is a pure tree.

38. The method of claim 32, wherein the hierarchical browse structure is a directed acyclic graph.

39. A computer program which, when executed by a computer system, performs the method of claim 32.

40. A web page generated according to the method of claim 32, said web page including representations of the non-leaf category and the at least one item.

41. The method of claim 32, wherein selecting at least one item to present to the user comprises recursively selecting items to elevate within each of a plurality of categories falling below said non-leaf category.

42. A method of personalizing the display of a hierarchical browse structure in which items are arranged within multiple levels of item categories, and in which items and item categories are represented as respective nodes of the hierarchical browse structure, the method comprising:

monitoring online actions of the user over time to collect personal user activity data;

analyzing the personal user activity data to generate, for each of a plurality of nodes of the hierarchical browse structure, a user-specific score reflective of the user's predicted affinity for that node, to thereby generate a plurality of user-specific scores; and using the user-specific scores to select, from a set of nodes falling below a first node within the hierarchical browse structure, a second node to elevate for display such that the second node is exposed to the user when the user accesses the first node;

wherein, by elevating the second node, the second node is exposed to the user without the user having to drill down within the hierarchical browse structure below the first node to a level of the second node.

43. The method of claim 42, wherein the second node represents a leaf category.

44. The method of claim 42, wherein the second node is a leaf node that represents a single item.

45. The method of claim 42, wherein the first node resides multiple levels above the second node in the hierarchical browse structure.

46. The method of claim 42, wherein the set of nodes consists of nodes falling multiple levels below the first node within the hierarchical browse structure.

47. The method of claim 42, wherein the second node is selected based further upon node popularity data reflective of actions of a plurality of users.

48. The method of claim 42, wherein the hierarchical browse structure is a directed acyclic graph.

49. The method of claim 42, wherein analyzing the personal user activity data comprises applying a personal recommendations algorithm to the personal user activity data.

50. A computer system that embodies the method of claim 42.

* * * * *

UNITED STATES PATENT AND TRADEMARK OFFICE
CERTIFICATE OF CORRECTION

PATENT NO. : 6,606,619 B2
DATED : August 12, 2003
INVENTOR(S) : Ortega et al.

Page 1 of 1

It is certified that error appears in the above-identified patent and that said Letters Patent is hereby corrected as shown below:

<u>Title page,</u>
Item [63], Related U.S. Application Data, replace "06/489,968" with
-- 09/442,677 --

<u>Column 1,</u>
Line 8, replace "06/489,968" with -- 09/442,677 --

Signed and Sealed this

Thirteenth Day of January, 2004

JON W. DUDAS
*Acting Director of the United States Patent and Trademark Office*